(12) United States Patent
Yuri et al.

(10) Patent No.: US 6,837,676 B2
(45) Date of Patent: Jan. 4, 2005

(54) GAS TURBINE

(75) Inventors: Masanori Yuri, Takasago (JP); Vincent Laurello, Miami, FL (US); Satoshi Hada, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 56 days.

(21) Appl. No.: 10/238,651

(22) Filed: Sep. 11, 2002

(65) Prior Publication Data

US 2004/0046326 A1 Mar. 11, 2004

(51) Int. Cl.[7] .................................................. F01D 5/18
(52) U.S. Cl. ................ 415/115; 415/173.7; 415/174.4; 415/174.5; 416/96 R; 416/97 R
(58) Field of Search .......................... 415/110–112, 115, 415/116, 173.7, 174.4, 174.5; 416/96 R, 96 A, 97 R, 95

(56) References Cited

U.S. PATENT DOCUMENTS

| | | | | |
|---|---|---|---|---|
| 3,801,218 A | * | 4/1974 | Moore ...................... | 416/97 R |
| 3,989,410 A | * | 11/1976 | Ferrari ....................... | 415/115 |
| 4,348,157 A | * | 9/1982 | Campbell et al. ............. | 416/95 |
| 4,466,239 A | * | 8/1984 | Napoli et al. ............... | 415/116 |
| 5,222,742 A | * | 6/1993 | Roberts .................... | 415/174.5 |
| 5,282,719 A | * | 2/1994 | McCarty et al. ............... | 416/1 |
| 6,189,891 B1 | | 2/2001 | Tomita et al. | |
| 2003/0223856 A1 | * | 12/2003 | Yuri et al. ................... | 415/115 |

FOREIGN PATENT DOCUMENTS

| | | | | |
|---|---|---|---|---|
| GB | 1268301 A | * | 3/1972 | ................. 415/115 |
| JP | 7-324633 | | 12/1995 | |
| JP | 3165611 | | 3/2001 | |

* cited by examiner

Primary Examiner—Christopher Verdier
(74) Attorney, Agent, or Firm—Oblon, Spivak, McClelland, Maier & Neustadt, P.C.

(57) ABSTRACT

A sealing air bypass flow path is provided in a gas turbine for supplying sealing air to a sealing air supply flow path by bypassing the flow path between each tangential on board injection (TOBI) nozzles and disk holes.

1 Claim, 4 Drawing Sheets

ROTATION DIRECTION

GAS TURBINE

BACKGROUND OF THE INVENTION

1. Field of the Invention

The present invention relates to a gas turbine that is rotationally driven using combusted gas from a combustor, and more specifically, to a gas turbine in which power is effectively increased by bleeding from tangential on board injection (TOBI) nozzles to rotor disks.

2. Description of Related Art

In a gas turbine plant, compressed air from a compressor is guided into a combustor, and the high-temperature gas generated when this compressed air is combusted along with a fuel is guided into the gas turbine to drive it. A typical design is one in which a portion of the compressed air is introduced into a cooling device as bleed air and cooled. The cooled bleed air is subsequently guided to stationary and moving blades on the gas turbine side, and used as cooling for these blades and as sealing air between the moving and stationary blades.

An example of a design for bleeding to the first stage unit of the moving and stationary blades in a conventional gas turbine will be explained below with reference to FIG. 4. FIG. 4 is a partial cross-sectional view showing the flow path of bleed air to the first stage unit. A compressor, which would be to the left on the page but is not shown in the figure, is coaxially disposed to the gas turbine.

In FIG. 4, the numerals 1 and 2 indicate first stage moving blades and first stage stationary blades, respectively. A plurality of first stage moving blades 1 are disposed in a circle around rotor disk 3 which is coaxial to the compressor. First stage moving blades 1 receive combustion gas HF from the compressor, and thereby turn first stage rotor disk 3. A plurality of first stage stationary blades 2 are disposed in a circle on the interior side of a vehicle so as to be coaxial to first stage rotor disk 3. First stage moving blades 1, first stage rotor disk 3 and first stage stationary blades 2 are provided in this way to form a first stage unit. A seal disk 7 is connected to the same shaft upstream from first stage unit. A plurality of disk holes 7a, which are penetrating holes through which bleed air from upstream passes to first stage unit, are formed centered about this shaft and at equal angle intervals from one another.

The numeral 5 in FIG. 4 is a bleeding chamber that takes up cooled bleed air f1 from the cooling device. Bleed air f1 which has been taken up into bleed air chamber 5 passes through disk holes 7a in seal disk 7, and is supplied into first stage rotor disk 3. This bleed air f1 is guided into each first stage moving blade and cools these blades from the inside. A plurality of tangential on board injection (TOBI) nozzles 10 are formed centered around the aforementioned shaft at the discharge port of bleeding chamber 5. Bleed air f1 is ejected along the direction of rotation of seal disk 7. By providing each TOBI nozzle 10 to impart swirling flow to bleed air f1 in this way, it is possible to reduce pumping losses.

The symbol f2 in FIG. 4 is sealing air from the compressor. After passing through labyrinths 8a, 8b, 8c and brass seal 9, this sealing air f2 crosses in front of the discharge port of each TOBI nozzle 10, passes through brass seal 12 and labyrinths 13a, 13b, and is supplied into space interval C between first stage moving blades 1 and first stage stationary blades 2. The sealing air f2 supplied to space interval C prevents combustion gas HF from leaking inside via this space interval C.

However, this conventional gas turbine has the problems explained below.

Namely, sealing air f2 on its way from the compressor to space interval C interferes with the swirling flow of bleed air f1 discharged from each TOBI nozzle 10 toward seal disk 7. For this reason, the circumferential speed component is reduced. The reduction in this circumferential speed component invites an increase in pumping losses. As a result, the effect of providing the TOBI nozzles 10 is lost. In other words, the gas turbine losses power.

If the reduction in this circumferential speed component is anticipated from the beginning, however, one might consider increasing this component by increasing the tilt angle of the TOBI nozzles. However, the delivery pressure from TOBI nozzles 10 is reduced when the circumferential speed component is increased. In this case, the difference between the delivery pressure of each TOBI nozzle 10 and the pressure of combustion gas HF becomes smaller, and the flow rate of sealing air f2 decreases. The sealing structure in space interval C may not function normally as a result. Infiltration of combustion gas HF from space interval C is linked to a reduction in the power for rotating each first stage moving blade 1. Thus, the turbine also losses power.

As explained above, when a circumferential speed component is added to the flow passing through seal disk 7 in order to increase the power of the gas turbine, then, conversely, the power drops.

BRIEF SUMMARY OF THE INVENTION

The present invention was conceived in view of the above-described circumstances and has as its objective the provision of a gas turbine for a design in which bleed air is supplied in a swirling flow from tangential on board injection (TOBI) nozzles to a seal disk, wherein this gas turbine can effectively improve power from the swirling flow.

The present invention employs the following means to resolve the above-described problems.

An aspect of the present invention is to provide a gas turbine comprising: a plurality of stationary blades disposed in a circle on an interior side of a vehicle; a plurality of moving blades disposed in a circle on a rotor disk side adjacent to these stationary blades; a seal disk coaxially connected to the upstream side of the rotor disk; a first TOBI nozzle that supplies bleed air taken up to the seal disk as swirling flow which rotates in the same direction as the seal disk; a sealing air supply flow path that communicates with a discharge port of the first TOBI nozzle and supplies sealing air to a space between the stationary blades and the moving blades; a disk hole provided in the seal disk for flowing the swirling flow; and a sealing air bypass flow path provided for supplying the sealing air to the sealing air supply flow path by bypassing the flow path between the first TOBI nozzle and the disk hole.

The above-described gas turbine is designed so that the sealing air which is directed toward the area between the stationary blades and the moving blades flows through the sealing air bypass flow path. Thus, the swirling flow which was discharged from the first TOBI nozzle is not subject to interference from the sealing air. As a result, the swirling flow is supplied to the disk holes with its circumferential speed component maintained, so that the rotational power of the seal disk is assisted by the swirling flow and the rotation of the seal disk is accelerated. As a result, the gas turbine's power can be increased.

In the above-described gas turbine, it is also acceptable to provide a double sealing structure between the stationary blades and the moving blades.

The swirling flow by the first TOBI nozzle decreases the static pressure at the discharge port of the first TOBI nozzle and reduces the flow rate at which the sealing air is provided. By providing a double layer sealing structure between the stationary blades and the moving blades in this gas turbine, however, it is possible to securely prevent introduction of combustion gas from this space interval even at low sealing air flow rates.

In the above-described gas turbine, a second TOBI nozzle may be provided which takes up a portion of the bleed air to form swirling flow, and controls the flow rate of sealing air to the sealing air bypass flow path.

In this gas turbine, when passing through the swirling flow formed by the second TOBI nozzle, the flow rate of sealing air which flows from upstream to the sealing air bypass flow path on the downstream side, is held constant on the downstream side of the swirling flow. Since the rate of flow of the sealing air is prevented from becoming excessively great, the rotating efficiency of the gas turbine can be further improved.

DETAILED DESCRIPTION OF THE INVENTION

An embodiment of a gas turbine of the present invention will be explained with reference to FIGS. 1~3. The present invention is of course not limited thereto.

Note that in the following discussion, the flow directions of sealing air S and bleed air F1 on the upstream side (i.e., left side of the paper in FIG. 1) and the flow directions of sealing air S and bleed air F1 on the downstream side (i.e., right side of the paper in FIG. 1) will be referred to as "upstream side" and "downstream side" respectively. Furthermore, the direction of the axis of rotation (to the left and right in FIG. 1) of the rotating member that includes seal disk 34 and first stage rotor disk 32 will be referred to as "axial direction" in the discussion.

Figure 1:
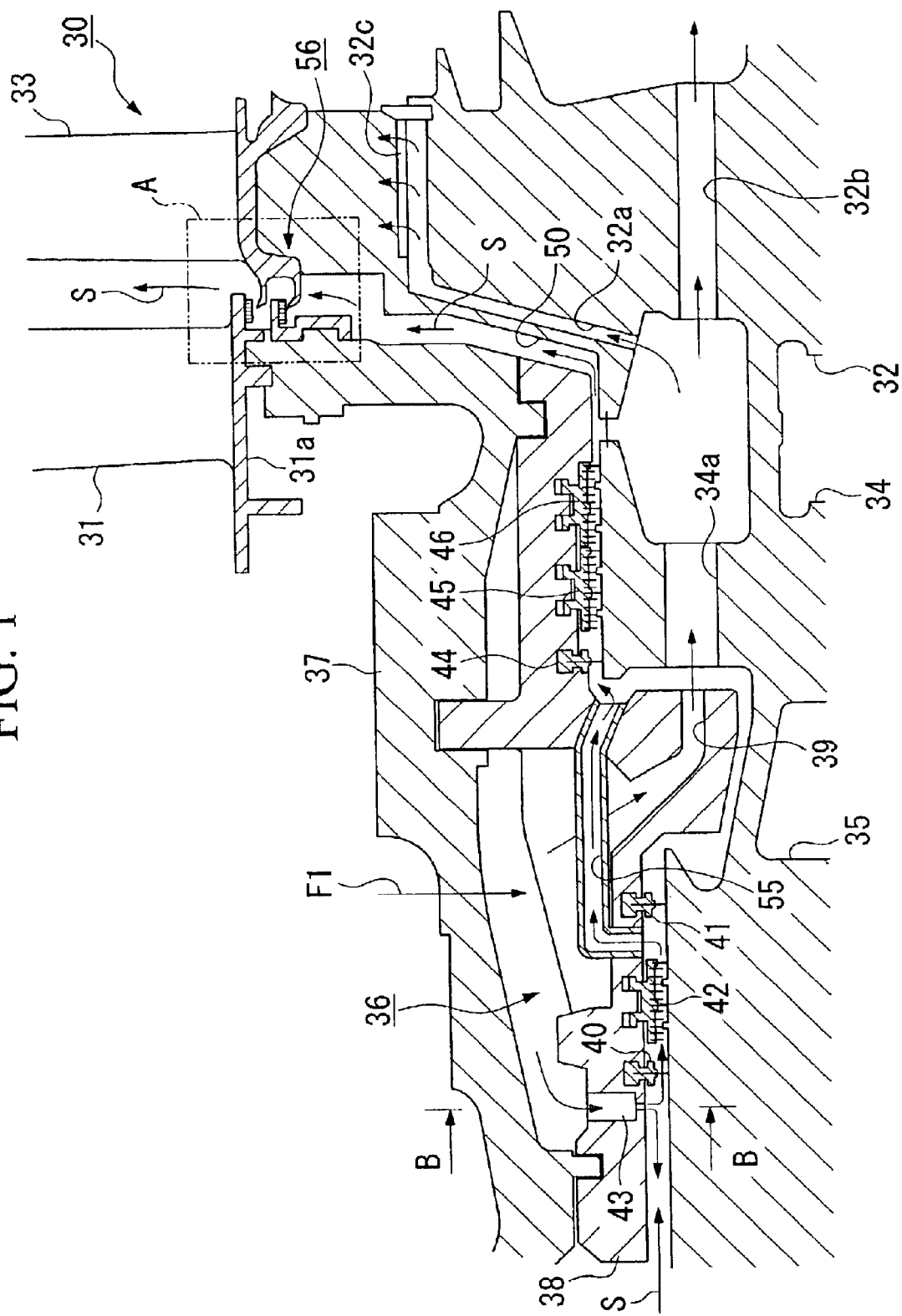
FIG. 1 shows an embodiment of a gas turbine according to the present invention, and is a partial cross-sectional view showing a flow path of bleed air to the first stage unit.

As shown in FIG. 1, the gas turbine of the present embodiment is equipped with a first stage unit 30 which has first stage stationary blades 31 (stationary blades) disposed in a circle on the interior side of a vehicle; first stage rotor disk 32 (rotor disk) adjacent to these first stage stationary blades 31; and first stage moving blades 33 (moving blades) disposed in a circle around first stage rotor disk 32. Note that a second stage unit, third stage unit, etc. (not shown) having the same structure are coaxially connected on the downstream side of first stage unit 30. As a result, stationary blades and moving blades are alternately disposed in the axial direction.

A plurality of first stage moving blades 33 are disposed around first stage rotor disk 32. By receiving the combustion gas from a combustion chamber, not pictured in the figures, this first stage rotor disk 33 undergoes rotational driving. Furthermore, a plurality of first stage stationary blades 31 are disposed internally on the interior side of a vehicle so as to be coaxial to first stage rotor disk 32.

The rotor disks of each stage, including first stage rotor disk 32, are coaxially stacked to form a single rotor, which is coaxially connected via seal disk 34 and connecting rotor 35 to the rotor for the compressor (not shown) that is disposed upstream.

The numeral 36 in FIG. 1 indicates a bleeding chamber for taking up bleed air discharged from the compressor after its been cooled by passing through a cooling device (not shown). Bleeding chamber 36 is formed as a circular space between a first partitioning wall 37, which is fixed to the inner peripheral side of inner shroud 31a of each first stage stationary blade 31, and a second partitioning wall 38 which is further held by the inner peripheral side of first partitioning wall 37.

A plurality of bleed air introducing holes (not shown) are formed in first partitioning wall 37 centered about the axis of rotation of each rotor disk. These bleed air introducing holes are for introducing bleed air F1 from the cooling device into bleeding chamber 36.

Second partitioning wall 38 is a circular component coaxially disposed around seal disk 34 and connecting rotor 35. This second partitioning wall 38 maintains the inside of first partitioning wall 37 in a stationary state. A plurality of tangential on board injection (TOBI) nozzles 39 are disposed in a circle centered along the width direction (axial direction) of the inner peripheral surface of second partitioning wall 38. Brass seals 40, 41 and labyrinth seal 42 are fixed in place at positions further upstream than the position of each TOBI nozzle 39 on the inner peripheral surface of second partitioning wall 38. TOBI nozzle 43 (second TOBI nozzle) is fixed in place at a position further upstream than TOBI nozzle 42 for taking up a portion of the bleed air F1 inside bleeding chamber 36 and forming swirling flow and blowing it toward the outer peripheral surface of connecting rotor 35. On the other hand, brass seal 44 and a pair of labyrinth seals 45, 46 are fixed in place to positions further downstream than each TOBI nozzle 39 on the inner peripheral surface of second partitioning wall 38.

Seal disk 34 is a rotor disk that is provided and connected between first stage rotor disk 32 and connecting rotor 35. A plurality of disk holes 34a are formed in a circumferential direction centered on the rotor disk's axis of rotation at equal angular distances from one another. The position of these disk holes 34a in the radial direction centered on the axis of rotation coincides with the center of the discharge port of each TOBI nozzle 39, with disk holes 34a forming penetrating holes which are parallel to the axis of rotation.

Bleed air F1 which has passed through these disk holes 34a passes through the disk holes formed in the rotor disks of each subsequent stage beyond first stage unit 30, and then passes through the moving blades of these later stages, cooling them from the inside. In other words, in the case of first stage unit 30, for example, a portion of bleed air F1 which has passed through disk holes 34a passes through radial holes 32a in first stage rotor disk 32, and is then guided into the flow path (not shown) that is formed inside first stage moving blades 33, cooling first stage moving blades 33. At the same time, a portion of the bleed air F1 after passing through each disk hole 34a is passed though disk hole 32b of first stage rotor disk 32 and employed in the cooling of the second and subsequent stage units (not shown).

Radial holes 32a are a plurality of flow paths formed in the radial direction of first stage rotor disk 32. Radial holes 32a are formed centered about the axis of first stage rotor disk 32 at equal angle intervals from one another. Furthermore, the flow rate of bleed air F1 that passes through radial holes 32a and is directed at each of first stage moving blades 33 is adjusted to a constant rate using orifice plates 32c provided to the first stage rotor disk 32. A plurality of orifices, not shown, are provided in orifice plate 32c and are for carrying out flow rate adjustment. In this embodiment, since bleed air F1 is provided as a swirling flow, supply pressure of bleed air F1 is low. To improve low supply pressure, the diameter of the orifice openings is made larger than that of the conventional designs (as necessary, orifice plate 32c may be omitted). For the same reason, the hole diameter of radial holes 32a may be made larger than that of the conventional designs.

The position of each disk hole 32b in the radial direction centered on the axis of rotation of first stage rotor disk 32 coincides with the center of each radial hole 32a, with disk holes 32b forming penetrating holes that are parallel to the axis of rotation. Similar disk holes are formed in the rotor disks of subsequent stages, with the hole diameters differing at each stage. As a result, the air bleed F1 flow rate for cooling which is supplied to the moving blades is automatically adjusted.

The symbol S indicates sealing air which is used to prevent combustion gas from entering internally via the space interval between first stage moving blades 33 and first stage stationary blades 31. Sealing air S is supplied from a compressor. Sealing air S traverses a sealing air supply flow path 50 which communicates with the discharge port of each TOBI nozzle 39 and is for supplying sealing air S to the aforementioned space interval. This sealing air supply flow path 50 is formed by providing a space interval flow path formed between the outer peripheral surface of sealing disk 34 and the inner peripheral surface of second partitioning wall 38, and a space interval flow path formed between first stage rotor disk 32 and first stage partitioning wall 37.

The gas turbine according to this embodiment is characterized in the provision of a sealing air bypass flow path 55, which provides sealing air S to sealing air supply flow path 50 by bypassing the flow path between the discharge port of each TOBI nozzle 39 and each disk hole 32b opposite these discharge ports; and a double layer sealing structure 56 that is disposed to the space between first stage moving blades 33 and first stage stationary blades 31.

Sealing air bypass flow path 55 is a pipe for taking up sealing air S, supplied from the compressor, after it has passed through TOBI nozzle 43, brass seal 40 and labyrinth seal 42, and guiding it though sealing air supply flow path 50. A plurality of sealing air bypass flow paths 55 are disposed centered about the axis of rotation of seal disk 34 at equal angle intervals from one another.

Figure 2:
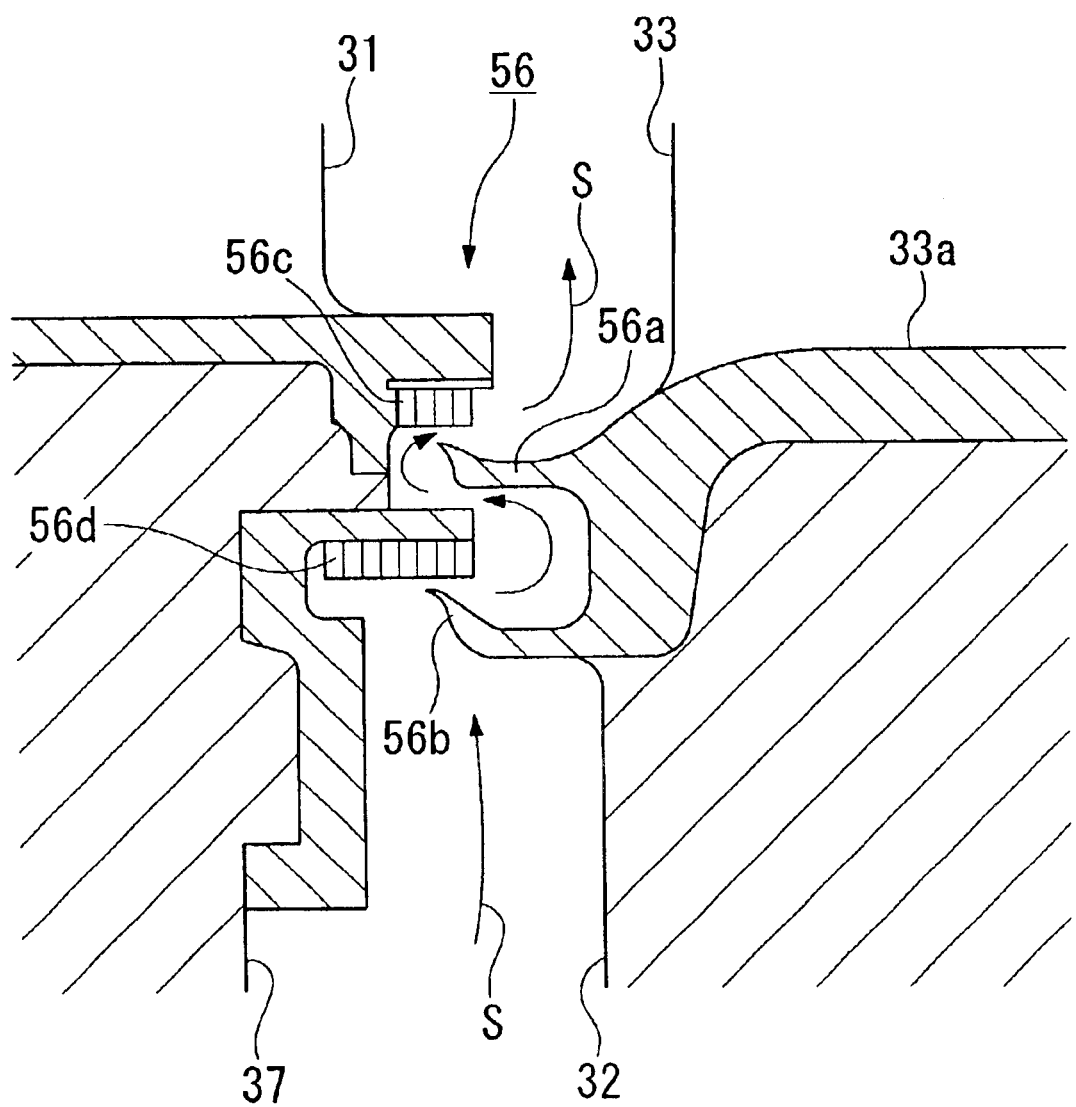
FIG. 2 shows the essential parts of this same component in the same gas turbine, and is an enlarged view of part A in FIG. 1.
Figure 3:
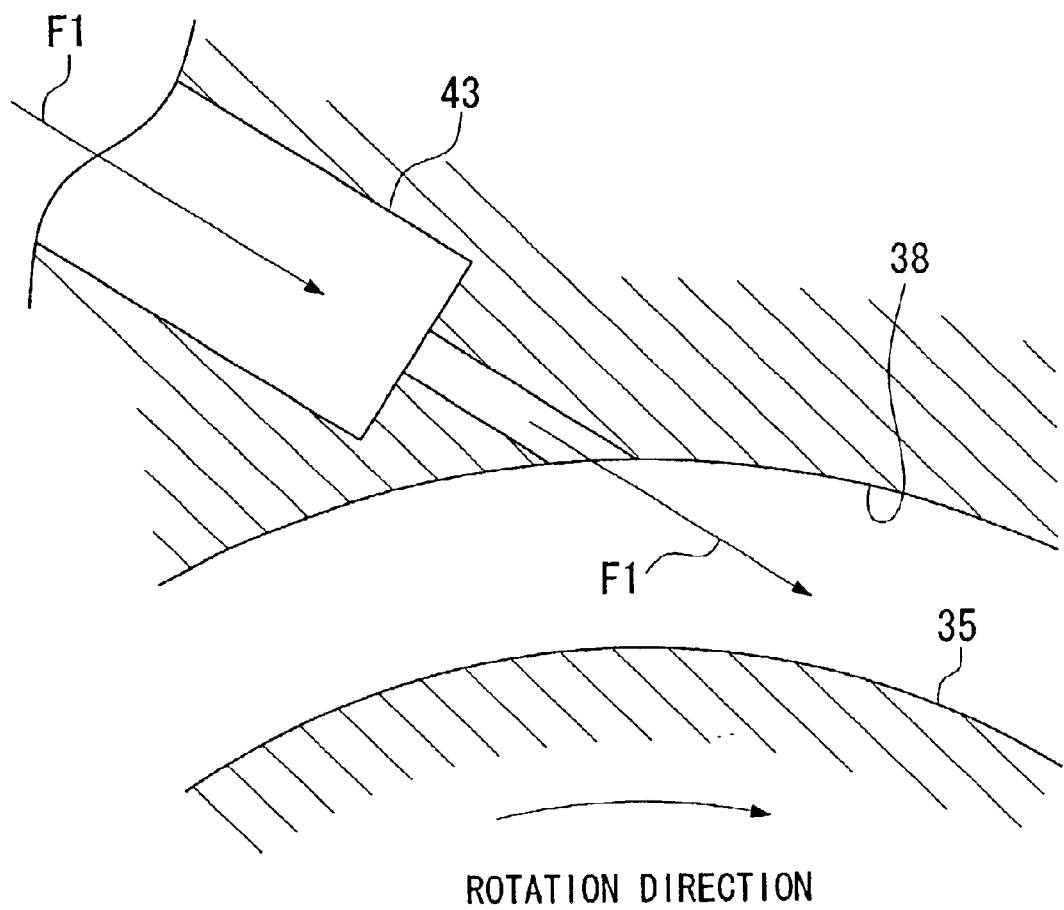
FIG. 3 shows other essential parts of this same component in the same gas turbine, and is a perspective view along the line B—B in FIG. 1.
Figure 4:
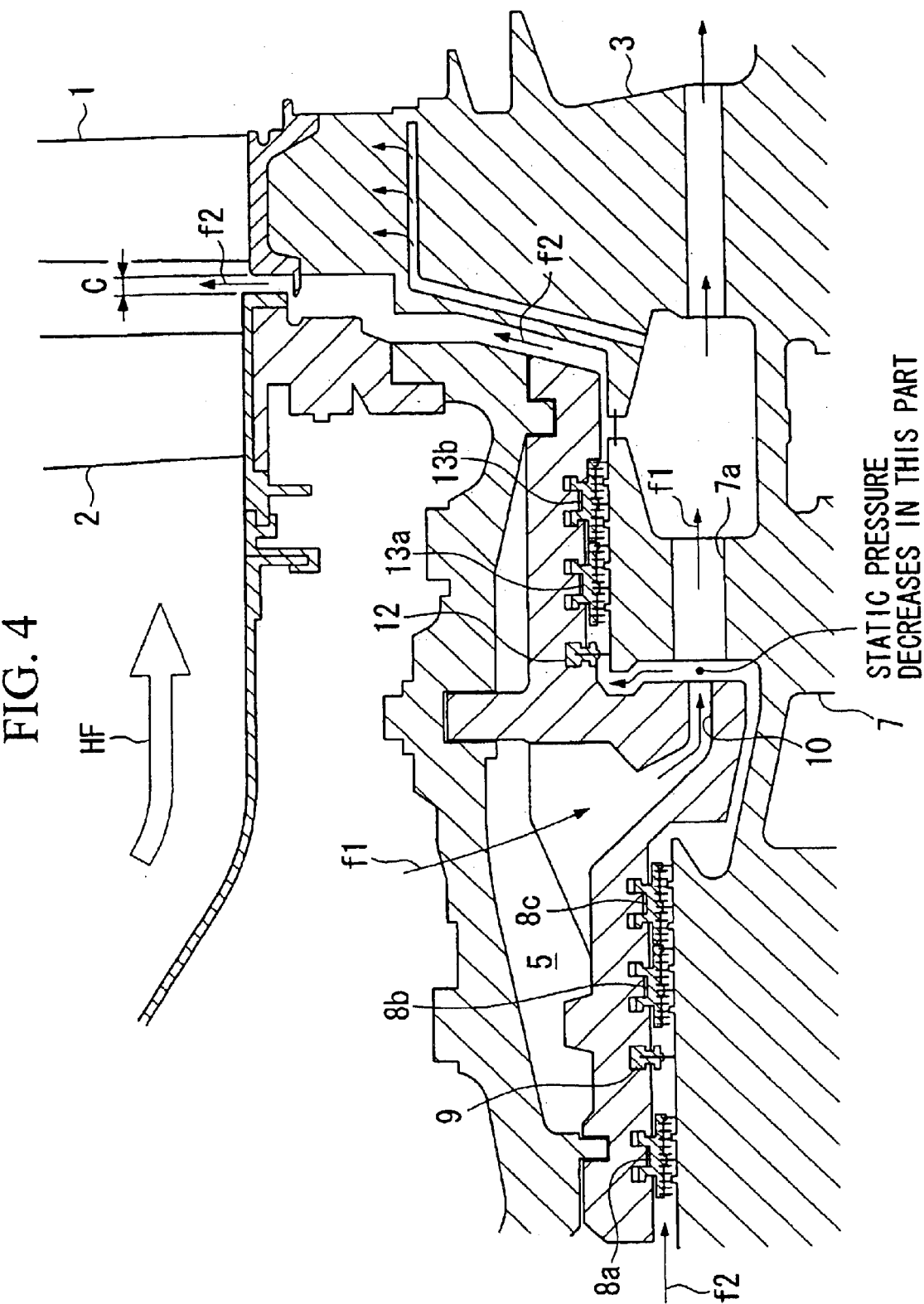
FIG. 4 shows an embodiment of a conventional gas turbine, and is a partial cross-sectional view showing a flow path of bleed air to the first stage unit.

As shown in FIG. 2, double layer sealing structure 56 is formed by providing two projections 56a, 56b that are formed to the upstream edge of inner shroud 33a on the first stage moving blades 33, and two sealing members 56c, 56d that slide against projections 56a, 56b respectively and are fixed in place on the first stage partitioning wall 37 side.

Sealing member 56c is fixed in place to the downstream edge of inner shroud 31a. Sealing member 56d is fixed in place to the downstream edge of first partitioning wall 37. Sealing members 56c, 56d and projections 56a, 56b are alternately disposed so as to engage with one another, to form a plurality of curved flow paths. These curved flow paths are double layer structures consisting of a first stage sealing structure formed of projection 56b and sealing member 56d and a second stage sealing structure formed of projection 56a and sealing member 56c. As compared to a single layer sealing structure, this double layer sealing structure can effectively seal a space interval even with sealing air S which has a low flow rate.

The gas turbine according to this embodiment is also characterized in the provision of a TOBI nozzle 43. As shown in FIG. 3, this TOBI nozzle 43 is provided in second partitioning wall 38 so as to connect bleed air chamber 36 and a sealing air S bypass flow path formed between the outer peripheral surface of connecting rotor 35 and the inner peripheral surface of second bleed air chamber 36.

A plurality of TOBI nozzles 43 are disposed at equal angle intervals from one another centered on the axis of rotation of connecting rotor 35. As a result of these TOBI nozzles 43, a portion of the bleed air F1 taken up inside bleed air chamber 36 is accelerated by reducing its area, and is ejected toward the outer peripheral surface of connecting rotor 35. Bleed air F1 ejected in this way forms a ring-shaped swirling flow around connecting rotor 35. As a result, the flow rate of sealing air S which comes from the compressor, passes through this swirling flow and is directed toward sealing air bypass flow paths 50, can be controlled and prevented from becoming excessively large.

The flow of bleed air F1 and sealing air S inside the gas turbine according to this embodiment having the above-described structure will be explained.

The flow of bleed air F1 will first be explained. Bleed air F1 which has been taken up inside bleed air chamber 36 forms a swirling flow by traveling through TOBI nozzles 39, and is ejected to sealing disk 34 in this state. Sealing air S ejected in this way forms a swirling flow that rotates in the same direction as the direction of rotation of sealing disk 34. As a result, sealing air S assists and accelerates the rotating power of sealing disk 34 when it passes through disk holes 34a. There is no interference from sealing air S on the swirling flow from each of TOBI nozzles 39 at this time, so that the circumferential speed component of the swirling flow can be maintained.

The formation of swirling flow by TOBI nozzles 39 results in a decrease in static pressure at the discharge ports of TOBI nozzles 39. However, as explained above, a double sealing structure 56 is employed in this embodiment between first stage stationary blades 31 and first stage moving blades 33. As a result, it is possible to securely prevent the introduction of combustion gas even at a low sealing air flow rate.

The flow area of a portion of the bleed air F1 that has passed through each disk hole 34a is reduced when traveling through orifice plate 32c after passing through radial holes 32a, and is supplied inside first stage moving blades 33 as cooling flow. The flow of bleed air F1 that has passed through disk holes 32b is supplied for cooling of moving blades in subsequent stages.

On the other hand, the bleed air F1 that was ejected from each TOBI nozzle 43 after being taken up inside bleed air chamber 36, forms a swirling flow that turns in the same direction around connecting rotor 35 and prevents the flow rate of sealing air S from becoming too large.

Next, the flow of sealing air S will be explained. Once sealing air S from the compressor has been held to a suitable rate using the swirling flow ejected from each TOBI nozzle 43, it passes through brass seal 40 and labyrinth seal 42, and is guided into sealing air bypass flow paths 55.

Sealing air S ejected from these sealing air bypass flow paths 55 passes through brass seal 44 and labyrinths 45, 46, is introduced into sealing air supply flow path 50, and is supplied to the space interval between first stage moving blades 33 and first stage stationary blades 31, thereby sealing the space.

In the gas turbine according to the embodiment described above, a design is employed that is provided with sealing air bypass flow paths 55, for supplying sealing air S to sealing air supply flow path 50 by bypassing the flow paths between TOBI nozzles 39 and disk holes 34a, and a double sealing structure 56 which is disposed in the space interval between first stage stationary blades 31 and first stage moving blades 33. As a result of this design, the swirling flow which is ejected from TOBI nozzles 39 at disk holes 34a does not experience interference from sealing air S. Thus, the swirling flow's circumferential speed component is maintained. As a result, the swirling flow effectively functions as a drive source for turning seal disk 34 even faster, so that the gas turbine's power can be increased. Furthermore, by providing a double sealing structure 56 in the space interval between first stage stationary blades 31 and first stage moving blades 33, it is possible to securely prevent introduction of combustion gas via this space. Thus, the drop in the flow rate of sealing air S due to the decrease in static pressure at the exit of TOBI nozzles 39 can be compensated.

Accordingly, since power loss does not occur, concern over causing a reduction in the energy generating capacity of the generator (not shown) connected to the gas turbine can be avoided.

The gas turbine according to this embodiment employs a design in which TOBI nozzles 43 are provided which take up a portion of bleed air F1, form it into swirling flow, and control the flow rate of sealing air S at sealing air bypass flow path 55. In this design as a result, the flow rate of sealing air S can be prevented from becoming excessively large. Accordingly, the rotating efficiency of the gas turbine can be even further improved.

What is claimed is:

1. A gas turbine comprising:

a plurality of stationary blades disposed in a circle;

a plurality of moving blades disposed in a circle on a rotor disk side adjacent to these stationary blades;

a seal disk coaxially connected to the upstream side of the rotor disk;

a first TOBI nozzle that supplies bleed air to the seal disk as a swirling flow which rotates in the same direction as the seal disk;

a sealing air supply flow path that communicates with a discharge port of the first TOBI nozzle and supplies sealing air to a space between the stationary blades and the moving blades;

a disk hole provided in the seal disk for flowing the swirling flow; and a sealing air bypass flow path provided for supplying the sealing air to the sealing air supply flow path by bypassing the flow path between the first TOBI nozzle and the disk hole, wherein a second TOBI nozzle is provided for taking up a portion of the bleed air, forming swirling flow, and controlling a rate of flow of the sealing air to the sealing air bypass flow path.

* * * * *